United States Patent [19]
Baer et al.

[11] Patent Number: 5,794,752
[45] Date of Patent: Aug. 18, 1998

[54] CLUTCH ACTUATOR

[75] Inventors: Kurt R. Baer, Toledo; George A. Willford, Waterville; Timothy R. Zuehlke, Toledo, all of Ohio

[73] Assignee: Dana Corporation, Toledo, Ohio

[21] Appl. No.: 775,460

[22] Filed: Dec. 30, 1996

[51] Int. Cl.$^6$ .................. F16D 23/14; F16D 25/08
[52] U.S. Cl. .................. 192/85 CA; 192/70.13; 192/91 A; 192/98; 192/DIG. 1
[58] Field of Search .................. 192/85 CA, 91 A, 192/70.13, DIG. 1, 98, 110 B, 89.24

[56] References Cited

U.S. PATENT DOCUMENTS

| | | |
|---|---|---|
| 4,344,516 | 8/1982 | Kolb . |
| 4,399,898 | 8/1983 | Olschewski et al. . |
| 4,405,041 | 9/1983 | Broadbent . |
| 4,588,061 | 5/1986 | Mallet . |
| 4,632,237 | 12/1986 | Maycock et al. . |
| 4,687,084 | 8/1987 | Leigh-Monstevens et al. . |
| 4,691,814 | 9/1987 | Wimbush . |
| 4,691,815 | 9/1987 | Maycock et al. . |
| 4,702,362 | 10/1987 | Banks et al. . |
| 4,778,039 | 10/1988 | Eliasson . |
| 4,858,741 | 8/1989 | Maycock et al. . |
| 4,869,355 | 9/1989 | Corral et al. . |
| 4,903,806 | 2/1990 | Flotow et al. . |
| 4,938,332 | 7/1990 | Thomas et al. . |
| 5,083,649 | 1/1992 | Baer .................. 192/85 CA X |
| 5,183,141 | 2/1993 | Abe et al. .................. 192/85 CA X |
| 5,318,162 | 6/1994 | Maucher et al. . |
| 5,443,143 | 8/1995 | Tobiasz .................. 192/85 CA |
| 5,456,344 | 10/1995 | Nellums . |
| 5,577,585 | 11/1996 | Corral .................. 19/85 CA X |
| 5,598,912 | 2/1997 | Uenohara .................. 192/85 CA X |

*Primary Examiner*—Rodney H. Bonck
*Attorney, Agent, or Firm*—MacMillan, Sobanski & Todd, LLC.

[57] ABSTRACT

A clutch actuator includes an outer cylinder housing having a plurality of ramps formed on an inner cylindrical surface thereof. Each of the ramps has a radially inwardly facing surface which includes a forwardly facing tapered surface and a rearwardly facing tapered surface. A hollow cylindrical piston is disposed concentrically within the outer cylinder housing and has a plurality of axially extending protrusions formed thereon. Preferably, the number of such protrusions is equal to the number of the ramps formed on the outer cylinder housing, and the protrusions are circumferentially interleaved within the ramps formed on the outer cylinder housing. Each of the protrusions has a radially outwardly facing surface which includes a forwardly facing tapered surface and a circumferentially extending groove. An inner cylinder housing is disposed concentrically within the piston. The outer and inner cylinder housings are fixed in position and define an annular chamber within which the piston can reciprocate axially. The piston is connected to a release sleeve of a clutch by means of a snap ring which is disposed within the grooves formed in the protrusions of the piston. Thus, the piston is connected to the release sleeve for axial movement therewith to operate the clutch. To disconnect the clutch actuator from the clutch, the piston is moved axially to a point where the snap ring engages the rearwardly facing tapered surfaces provided on the ramps of the outer cylinder housing. The rearwardly facing tapered surfaces provided on the ramps move the snap ring out of the grooves formed in the protrusions, thereby disconnecting the piston from the release sleeve.

20 Claims, 7 Drawing Sheets

CLUTCH ACTUATOR

BACKGROUND OF THE INVENTION

This invention relates in general to an actuating mechanism for operating a clutch in a vehicle drive train assembly. More specifically, this invention relates to an improved structure for a clutch actuator for selectively engaging and disengaging a friction clutch in such a vehicle drive train assembly which is relatively simple to install and remove.

Clutches are well known devices which are used to selectively connect a source of rotational power, such as an output shaft from an engine of a vehicle, to a driven mechanism, such as a vehicle transmission, in a vehicle drive train assembly. Typically, a cover of the clutch is connected to a flywheel secured to the end of the engine output shaft for rotation therewith. A pressure plate is disposed within the clutch between the cover and the flywheel. The pressure plate is connected for rotation with the flywheel and the cover, but is permitted to move axially relative thereto. A driven disc assembly is disposed within the clutch between the pressure plate and the flywheel. The driven disc assembly is supported on the output shaft of the clutch for rotation therewith, but is permitted to move axially relative thereto. The output shaft of the clutch functions as the input shaft to the transmission.

To engage the clutch, the pressure plate is moved axially toward the flywheel to an engaged position. In the engaged position, the driven disc assembly is frictionally engaged between the pressure plate and the flywheel. As a result, the output shaft of the clutch is driven to rotate with the flywheel, the cover, and the pressure plate. In this manner, the clutch is engaged to transmit power from the engine of the vehicle to the transmission. As a result, the vehicle can be driven in a normal manner. To disengage the clutch, the pressure plate is moved away from the flywheel to a disengaged position. In the disengaged position, the pressure plate is spaced apart from the flywheel, and the driven disc assembly is released from the frictional engagement therebetween. As a result, the output shaft of the clutch is disconnected from the flywheel, the cover, and the pressure plate. In this manner, the clutch is disengaged to prevent power from being transmitted from the engine of the vehicle to the transmission. The clutch is usually disengaged to facilitate a gear shifting operation to occur within the transmission.

Thus, the clutch is operated in the engaged and disengaged modes as a result of axial movement of the pressure plate of the clutch between the engaged and disengaged positions. To effect such axial movement of the pressure plate, most clutches are provided with a release assembly including a generally hollow cylindrical release sleeve which is disposed about the output shaft of the clutch. The forward end of the release sleeve extends within the clutch and is connected through a plurality of levers or other mechanism to the pressure plate. In this manner, axial movement of the release sleeve causes corresponding axial movement of the pressure plate between the engaged and disengaged positions. Usually, one or more engagement springs are provided within the clutch to urge the pressure plate toward the engaged position. The engagement springs typically react between the release sleeve and the cover to normally maintain the clutch in the engaged condition. The rearward end of the release sleeve extends outwardly from the clutch through a central opening formed through the cover.

Because it is connected with the cover and the pressure plate of the clutch, the release sleeve is constantly driven to rotate whenever the vehicle engine is operating. Thus, an annular release bearing is usually mounted on the rearward end of the release sleeve. The release bearing is axially fixed on the release sleeve and includes an inner race which rotates with release sleeve, an outer race which is restrained from rotation, and a plurality of bearings disposed between the inner race and the outer race to accommodate such relative rotation. The non-rotating outer race of the release bearing is typically engaged by an actuating mechanism for moving the release sleeve (and, therefore, the pressure plate) between the engaged and disengaged positions to operate the clutch.

In the past, the actuating mechanism has been embodied as a mechanical linkage which connects a manually-operated clutch pedal located in the driver compartment of the vehicle with the outer race of the release bearing. When the clutch pedal was depressed by the foot of the driver, the mechanical linkage moved the release bearing from the engaged position to the disengaged position. When the clutch pedal was released, the engagement springs within the clutch returned the release bearing from the disengaged position to the engaged position. Manually operated clutches of this general type are well known in the art and are relatively simple, inexpensive, and lightweight in structure and operation. Because of this, the majority of medium and heavy duty truck clutch/transmission assemblies in common use today are manually operated. More recently, however, in order to improve the convenience of use of manually operated clutch/transmission assemblies, various structures have been proposed for partially or fully automating the shifting of an otherwise manually operated transmission. In a partially or fully automated manual transmission, the driver-manipulated clutch pedal may be replaced by an automatic actuator, such as a hydraulic or pneumatic actuator. The operation of the automatic actuator can be controlled by an electronic controller or other control mechanism to selectively engage and disengage the clutch without manual effort by the driver, thereby facilitating the shifting of the transmission.

A number of clutch actuator structures are known in the art. Typically, such clutch actuator structures are mounted on the front end of the transmission and extend forwardly into releasable engagement with the release bearing of the clutch. Unfortunately, known clutch actuator structures have been found to be relatively difficult to install and remove from the clutch, which is periodically necessary to service the clutch and the transmission. Thus, it would be desirable to provide an improved structure for an clutch actuator which is relatively simple to install and remove.

SUMMARY OF THE INVENTION

This invention relates to an improved structure for an clutch actuator which is relatively simple to install and remove from the clutch. The clutch actuator includes an outer cylinder housing having a plurality of ramps formed on an inner cylindrical surface thereof. Each of the ramps has a radially inwardly facing surface which includes a forwardly facing tapered surface and a rearwardly facing tapered surface. A hollow cylindrical piston is disposed concentrically within the outer cylinder housing and has a plurality of axially extending protrusions formed thereon. Preferably, the number of such protrusions is equal to the number of the ramps formed on the outer cylinder housing, and the protrusions are circumferentially interleaved within the ramps formed on the outer cylinder housing. Each of the protrusions has a radially outwardly facing surface which includes a forwardly facing tapered surface and a circumferentially extending groove. An inner cylinder housing is disposed concentrically within the piston. The outer and inner cylinder housings are fixed in position and define an annular chamber within which the piston can reciprocate axially. The piston is connected to a release sleeve of a clutch by means of a snap ring which is disposed within the grooves formed in the protrusions of the piston. Thus, the piston is connected to the release sleeve for axial movement therewith to operate the clutch. To disconnect the clutch actuator from the clutch, the piston is moved axially to a point where the snap ring engages the rearwardly facing tapered surfaces provided on the ramps of the outer cylinder housing. The rearwardly facing tapered surfaces provided on the ramps move the snap ring out of the grooves formed in the protrusions, thereby disconnecting the piston from the release sleeve.

Various objects and advantages of this invention will become apparent to those skilled in the art from the following detailed description of the preferred embodiment, when read in light of the accompanying drawings.

DETAILED DESCRIPTION OF THE PREFERRED EMBODIMENT

Figure 1:
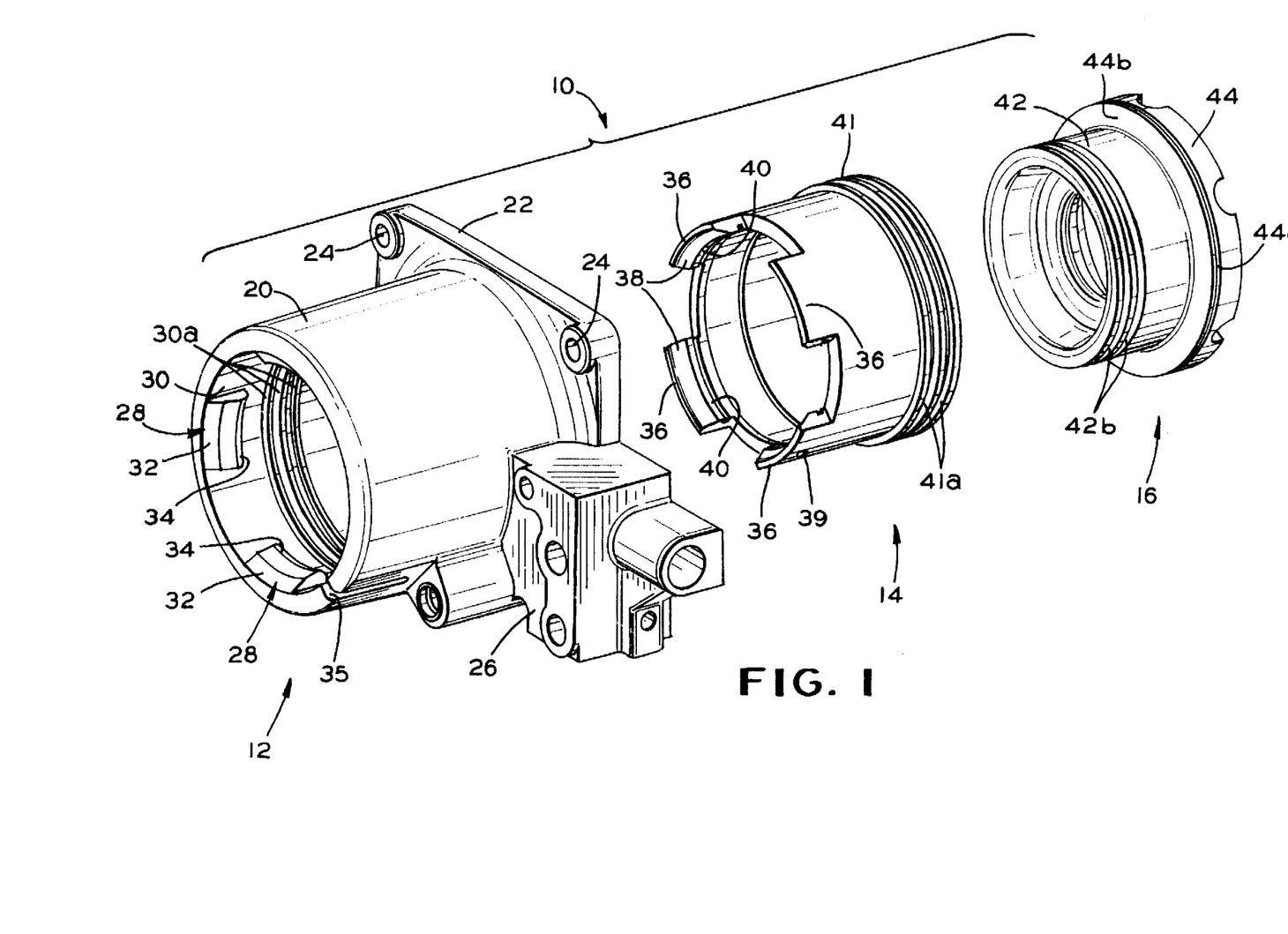
FIG. 1 is an exploded perspective view of a clutch actuator in accordance with this invention.

Referring now to the drawings, there is illustrated in FIG. 1 a clutch actuator, indicated generally at 10, in accordance with this invention. The clutch actuator 10 includes an outer cylinder housing, indicated generally at 12, a hollow cylindrical piston, indicated generally at 14, and an inner cylinder housing, indicated generally at 16. The outer cylinder housing 12 includes a hollow cylindrical body 20 having a generally rectangular flange 22 formed integrally at one end (the rearward or right end when viewing the drawings) thereof. The flange 22 has a plurality of axially extending apertures 24 formed therethrough which are provided to facilitate attachment of the outer cylinder housing 12 to a support surface by a plurality of fasteners (not shown), as will be described further below. The outer cylinder housing 12 further includes a manifold 26 which can be formed integrally with the cylindrical body 20. The purpose of the manifold 26 will be described below.

The cylindrical body 20 of the outer cylinder housing 12 includes an inner cylindrical surface 30 having at least one, and preferably a plurality, of ramps, each indicated generally at 28, formed thereon. The illustrated ramps 28 are located at the end of the cylindrical body 20 opposite the flange 22 (the forward or left end when viewing the drawings). In the illustrated embodiment, four of such ramps 28 are equally spaced about the forward end of the inner surface 30 of the cylindrical body 20. However, a greater or lesser number of such ramps 28 can be provided if desired. Each of the ramps 28 has a radially inwardly facing surface which includes a forwardly facing tapered surface 32 and a rearwardly facing tapered surface 34. A slot 35 is formed through the forward portion of the cylindrical body 20 and extends axially rearwardly toward the manifold 26 between two adjacent ramps 28. The purposes for the ramps 28 and the slot 35 will be explained below. A plurality of annular grooves 30a are formed in the inner surface 30 of the cylindrical body 20 of the outer cylinder housing 12 for a purpose which will also be explained below.

The piston 14 is disposed concentrically within the outer cylinder housing 12 and is formed as a hollow cylindrical member having at least one, and preferably a plurality, of axially forwardly projecting protrusions 36. Preferably, the number of such protrusions 36 is the same as the number of the ramps 28 formed on the cylindrical body 20 of the outer cylinder housing 12. Thus, in the illustrated embodiment, four protrusions 36 are equally spaced about the forward end of the piston 14. However, a greater or lesser number of such protrusions may be provided on the piston 14. When assembled, the piston 14 is disposed concentrically within the cylindrical body 20 of the outer cylinder housing 12. The protrusions 36 are sized and spaced so that the protrusions 36 are interleaved circumferentially between the ramps 28 formed on the cylindrical body 20 when the piston 14 is disposed within the outer cylinder housing 12. In other words, when the piston 14 is disposed within the outer cylinder housing 12, the protrusions 36 are axially aligned with the spaces defined between adjacent ones of the ramps 28. Each of the protrusions 36 has a radially outwardly facing surface including a forwardly facing tapered surface 38 and a circumferentially extending groove 40 located rearwardly of the tapered surface 38. An aperture 39 is formed through at least one of the protrusion 36. The purposes for the forwardly facing surfaces 38, the circumferential grooves 40, and the aperture will be explained below. At the rearward end of the piston 14, an enlarged diameter outer rim 41 is formed. The outer surface of the outer rim 41 has a pair of annular grooves 41a and 41b formed therein for a purpose which will also be explained below.

The inner cylinder housing 16 is disposed concentrically within the piston 14 and includes a hollow cylindrical body 42 having an enlarged diameter rim 44 formed at the rearward end thereof. At the forward end of the inner cylinder housing 16, a pair of annular grooves 42a and 42b are formed. Similarly, an annular groove 44a is formed about the rim 44 of the piston. The purposes for the grooves 42a, 42b, and 44a will be explained below.

Figure 2:
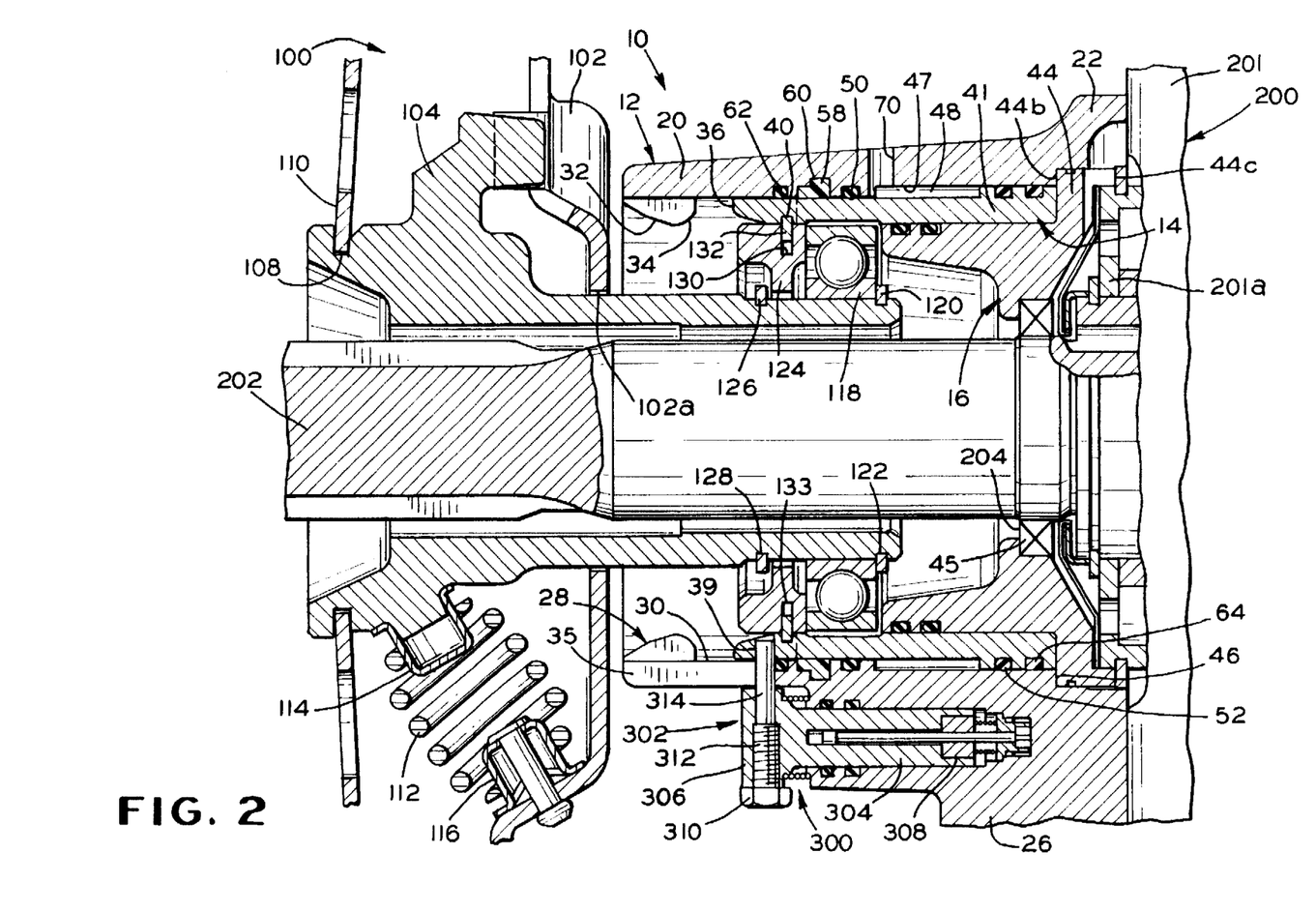
FIG. 2 is sectional elevational view of the clutch actuator illustrated in FIG. 1 together with portions of a clutch and a transmission in a vehicle drive train system, wherein the clutch actuator is shown in a fully retracted position.

Referring now to FIG. 2, the clutch actuator 10 is shown assembled between a clutch, a portion of which is generally indicated at 100, and a transmission, a portion of which is generally indicated at 200. The clutch 100 and the transmission 200 are both conventional in the art, and only those portions thereof which are necessary for a complete understanding of this invention are described and illustrated. To assemble the clutch actuator 10, the piston 14 is initially disposed concentrically within the outer cylinder housing 12 such that the protrusions 36 are interleaved circumferentially between the ramps 28 formed on the inner surface 30 of the cylindrical body 20 of the outer cylinder housing 12. Then, the inner cylinder housing 16 is disposed concentrically within the piston 14. Lastly, the outer cylinder housing 12 is secured to a forwardly facing surface of a housing 201 of the transmission 200 by threaded fasteners (not illustrated) or other means which extend through the apertures 24 formed through the flange 22. When this is done, a forwardly facing surface 44b of the rim 44 of the inner cylinder housing 16 abuts a complementary shaped, rearwardly facing annular surface 46 formed within the outer cylinder housing 12. At the same time, a rearwardly facing surface 44c of the rim 44 abuts portions of a bearing 201 a mounted in the forward end of the transmission housing 201. Thus, the inner cylinder housing 16 is captured between the transmission housing 201 and the outer cylinder housing 12 so as to be fixed in position relative to the transmission housing 201 and outer cylinder housing 16. At the same time, the rim 41 of the piston 14 is received in an undercut 47 at the rearward end of the inner cylindrical surface 30. Thus, the piston 14 is capable of being axially movable relative to the inner cylinder housing 16 and the outer cylinder housing 12, as will be described in detail below.

The clutch 100 is a conventional pull-to-release type clutch and includes a cover 102 which is connected to a flywheel (not illustrated) for rotation therewith. The flywheel and the cover 102 are thus driven by an engine of the vehicle for rotation about an axis. The cover 102 has a central opening 102a formed therethrough which receives a hollow, generally cylindrical release sleeve 104. The release sleeve 104 is disposed concentrically about a transmission input shaft 202. The transmission input shaft 202 is extends through a shaft seal 204 mounted on the inner cylinder housing 16 into the transmission 200. A driven disc assembly (not shown) is mounted within the clutch 100 on the forward end of the transmission input shaft 202 for rotation therewith and for axial movement relative thereto. When the clutch 100 is engaged, torque is transmitted from the driven disc assembly to the transmission input shaft 202 in a known manner. When the clutch 100 is disengaged, no torque is transmitted from the driven disc assembly to the transmission input shaft 202.

A forward end of the release sleeve 104 has an annular groove 108 formed thereabout. The groove 108 receives the radially innermost ends of a plurality of clutch operating levers 110 therein. Thus, axial movement of the release sleeve 104 causes pivoting movement of the clutch operating levers 110 which, in turn, causes engagement and disengagement of the clutch in a known manner. A plurality of clutch engagement springs 112 (only one of which is illustrated) reacts between the cover 102 and the forward end of the release sleeve 104. The ends of the clutch engagement springs 112 are preferably supported on respective seats 114 and 116 provided on the release sleeve 104 and the cover 102. The springs 112 urge the release sleeve 104 axially forwardly (toward the left when viewing FIGS. 2 through 7) toward an engaged position, wherein the components of the clutch 100 are frictionally engaged so as to cause the transmission input shaft 202 to be rotatably driven by a source of rotational power (not shown), such as a vehicle engine. When the release sleeve 104 is moved axially rearwardly (toward the right when viewing FIGS. 2 through 7) against the urging of the engagement springs 112 toward a disengaged position, the components of the clutch 100 are frictionally disengaged so as to prevent the transmission input shaft 202 from being rotatably driven by the source of rotational power.

The rearward end of the release sleeve 104 extends axially rearwardly through the central opening in the cover 102. An annular release bearing 118 is disposed about the rearward end of the release sleeve 104 and is retained on one side by a snap ring 120 disposed within an annular groove 122. A retaining ring 124 is also disposed about the rearward end of the release sleeve 104 adjacent to the forward side of the release bearing 118. A snap ring 126 is disposed in an annular groove 128 in the release sleeve 104 to retain the retaining ring 124 on the release sleeve 104. Thus, the release bearing 118 and the retaining ring 124 are secured to the release sleeve 104 for axial movement therewith.

An annular groove 130 is formed in the outer surface of the retaining ring 124. A snap ring 132 and a wave spring 133 are disposed within the groove 130. The wave spring 133 is disposed within the snap ring 132 so as to urge it radially outwardly. As shown in FIG. 2, the snap ring 132 is sufficiently large, however, as to be simultaneously received not only in the groove 130 formed in the retaining ring 124, but also in each of the grooves 40 formed in the protrusions 36 of the piston 14. Thus, the snap ring 132 connects the piston 14 with the retaining ring 124 such that axial movement of the piston 14 causes corresponding axial movement of the retaining ring 124, the release bearing 118, and the release sleeve 104.

An annular chamber 48 is defined between the outer surface of the body of the piston 14, the enlarged rim 41 formed at the rearward end of the piston 14, and the undercut 47 formed in the inner surface 30 of the outer cylinder housing 12. The chamber 48 is sealed to form a fluid-tight chamber by sealing elements, such as O-rings 50 and 52. The O-ring 50 is received in one of the annular grooves 30a formed in the inner surface 30 of the cylindrical body 20 of the outer cylinder housing 12, while the O-ring 52 is received in one of the annular grooves 41a formed in the outer surface of the rim 41 of the piston 14. An annular scraper element 58, preferably formed from a material such as polyurethane, is received in another one of the annular grooves 30a formed in the inner surface 30 of the cylindrical body 20 of the outer cylindrical housing 12. The scraper element 58 is provided to prevent any debris on the forward outer surface of the piston 14 from entering into the chamber 48 as the piston 14 reciprocates axially relative to the outer and inner cylinder housings 12 and 16, respectively. A pair of glide rings 62 and 64, preferably formed from a material such as nylon, are provided to facilitate the concentric disposition of the piston 14 within the outer cylinder housing 12 so that the piston 14 can move relatively freely in the axial direction without undue friction or binding. The glide ring 62 is disposed in another one of the annular grooves 30a formed in the inner surface 30 of the cylindrical body 20 of the outer cylindrical housing 12, while the glide ring 64 is disposed in another one of the grooves 41 a formed in the outer surface of the rim 41 of the piston 14. A radially extending port 70 is formed through the outer cylinder housing 12. The port 70 is provided to permit fluid communication between an external source of pressurized fluid (not shown) and the chamber 48. As will be explained in detail below, pressurized fluid is used to effect axial movement of the piston 14 in one direction relative to the inner cylinder housing 16 and the outer cylinder housing 12.

A position sensor, indicated generally at 300, is provided on the manifold 26 of the outer cylinder housing 12 for generating an electrical signal which is representative of the axial position of the piston 14 relative to the outer and inner cylinder housings 12 and 16. Such an electrical position signal may be used by an electronic controller (not shown)

or other control mechanism for automatically operating the clutch actuator 10. The position sensor 300 is conventional in the art and includes a movable member, indicated generally at 302, having a stem portion 304 and a head portion 306. The stem portion 304 is received in a bore formed through the manifold 26 which extends substantially parallel to the transmission input shaft 202. The stem portion 304 includes a resistor assembly 308 which produces a variable electrical signal depending upon the position of the stem portion 304 relative to the manifold 26. A pin 310 is received in a bore of the head portion 306 and extends substantially perpendicular to the stem portion 304. The pin 310 includes a threaded portion 312 which cooperates with threads formed in the head portion 306 to retain it therein. The pin 310 terminates in an extension 314 which extends through the axial slot 35 formed in the outer cylinder housing 12 into the aperture 39 formed through the projection 36. As a result, the movable member 302 is connected with the piston 14 for axial movement therewith. Thus, as the piston 14 moves axially relative to the outer cylinder housing 12 and the inner cylinder housing 16, the pin 310 causes corresponding movement of the movable member 302 of the linear position sensor 300. The sensor 300 thus generates the electric position signal. While only one of the projections 36 is illustrated with an aperture 39 for receiving the pin extension 314, it may be desirable to form an aperture 39 in each projection 36 for ease of assembling the piston 14 with the outer cylinder housing 12.

The operation of the clutch actuator 10 will now be described. FIG. 2 illustrates the clutch actuator 10 in a fully retracted position, wherein the piston 14 is located in its most axially rearwardly position relative to the outer cylinder housing 12 and the inner cylinder housing 16. This position is achieved by supplying pressurized fluid within the chamber 48 so as to move the piston 14 rearwardly against the urging of the clutch engagement springs 112. In FIG. 2, the piston 14 is shown fully retracted such that a rearwardly facing surface of the piston 14 abuts the forwardly facing surface 44b of the rim 44 of the inner cylinder housing 16. In this position, the piston 14 (by means of the snap ring 132, the retaining ring 124, and the release bearing 118) has pulled the release sleeve 104 to its rightmost position. This is a fully disengaged position for the clutch 100, wherein no torque is transferred from the source of rotational power to the transmission input shaft 202. The piston 14 is normally moved to this position only during the initial start-up of the vehicle.

Figure 3:
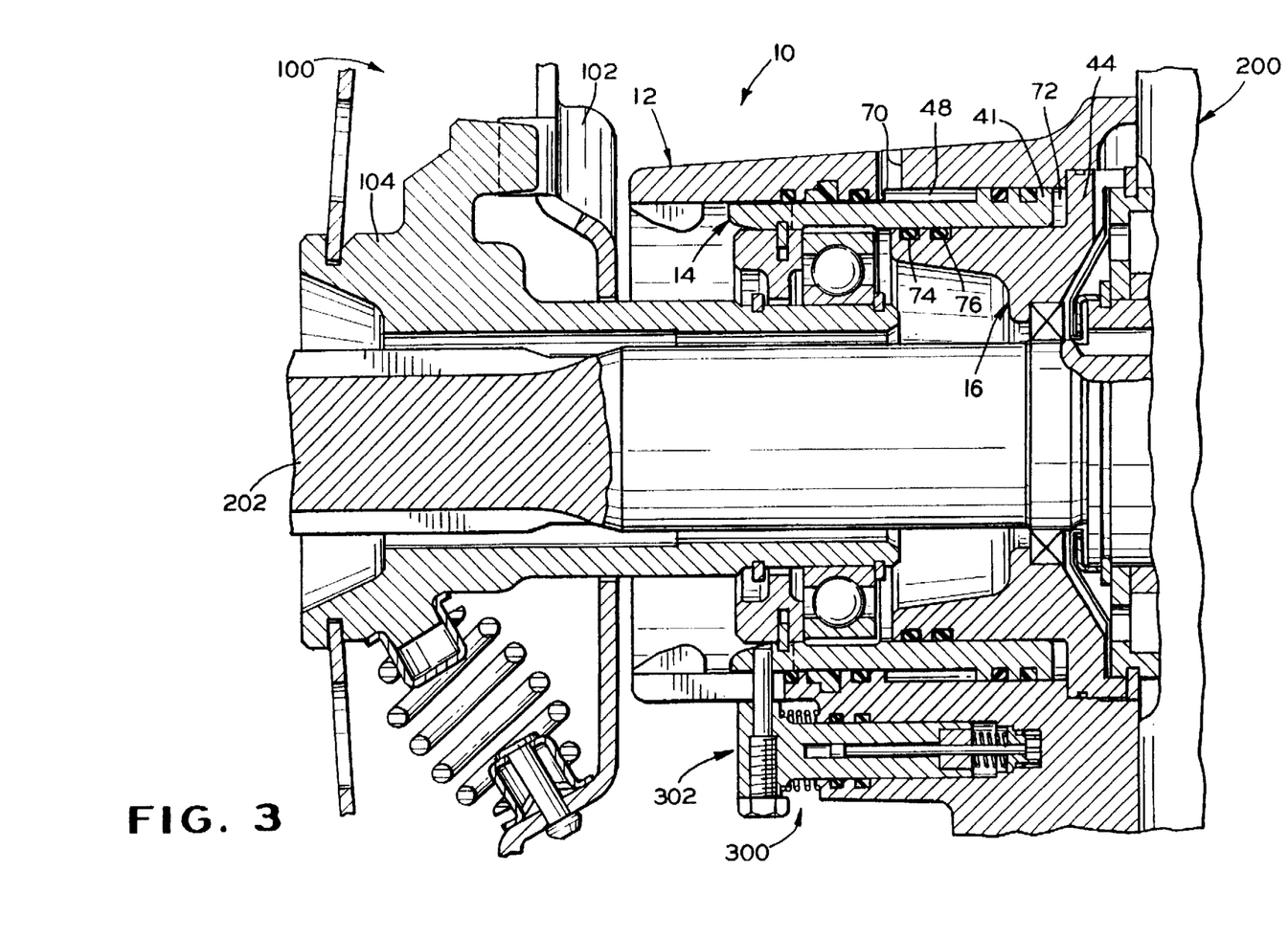
FIG. 3 is sectional elevational view similar to FIG. 2 wherein the clutch actuator is shown in a normally disengaged position.

By releasing the pressurized fluid in the chamber, the clutch engagement springs 112 cause the release sleeve 104 and the piston 14 to move forwardly (from right to left in FIGS. 2 through 7) from the disengaged position to an engaged position. This movement is sequentially illustrated in FIGS. 3 through 5. Referring first to FIG. 3, the piston 14 is shown after having been moved a relatively short distance axially forwardly. When the piston 14 is in the FIG. 3 position, the clutch 100 is still disengaged so as to prevent the transfer of torque from the source of rotational power to the transmission input shaft 202. During operation of the clutch 100, it is typically not necessary to move the piston 14 (and the release sleeve 104 and other associated components of the clutch 100) all the way to the fully retracted position illustrated in FIG. 2 to effect a shifting operation within the transmission 200. Rather, it has been found sufficient to move the piston 14 only to the disengaged position illustrated in FIG. 3. While the piston 14 is maintained in this disengaged position, shifting among the gear ratios of the transmission 200 can occur freely.

Figure 4:
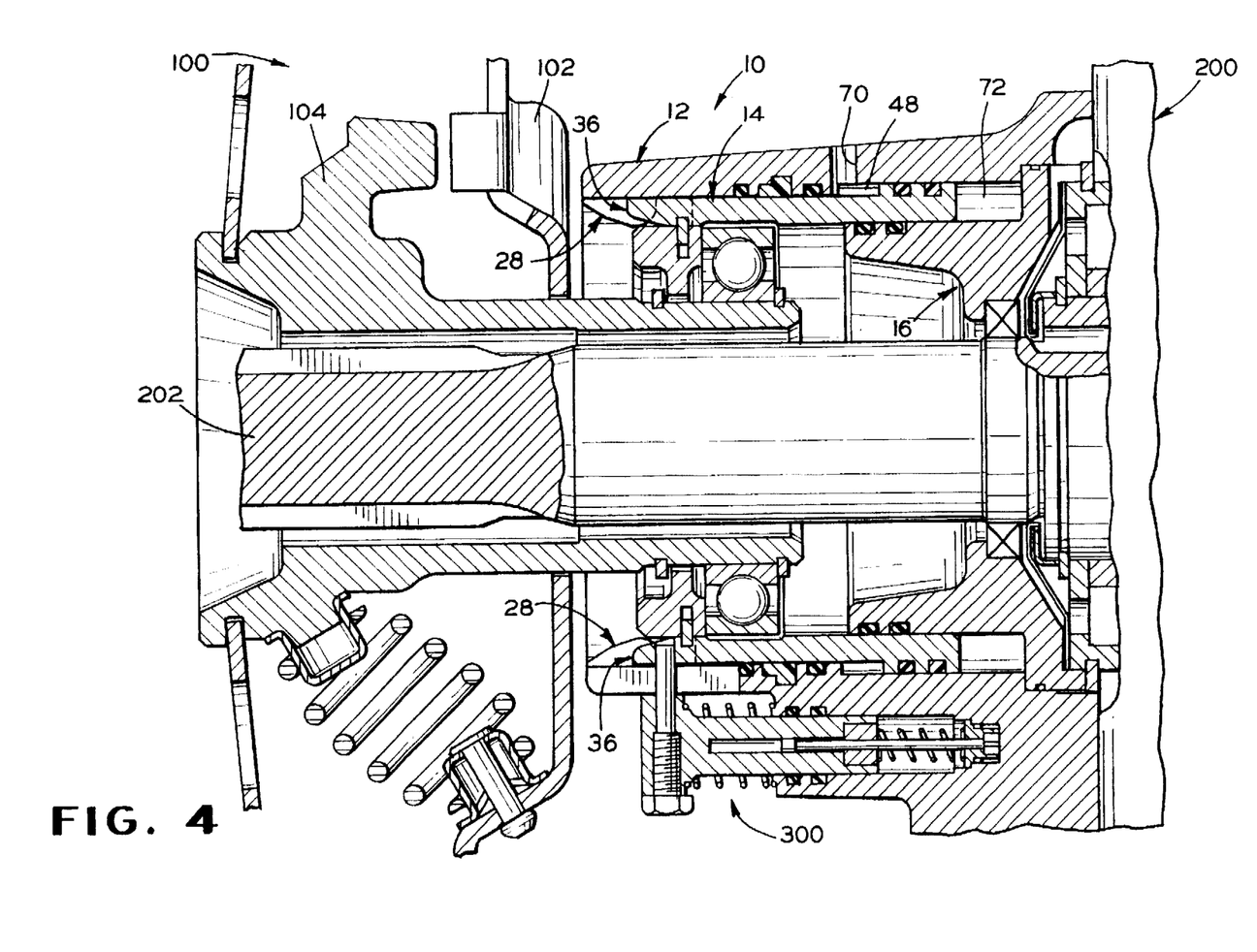
FIG. 4 is sectional elevational view similar to FIG. 3 wherein the clutch actuator is shown in a normally engaged position when the components of the clutch are relatively new.

After the shifting operation within the transmission 200 has been completed, the piston 14 must be moved axially forwardly from the position illustrated in FIG. 3 to engage the clutch 100 for operation. FIG. 4 illustrates the position of the piston 14, the release sleeve 104, and other components in the fully engaged position. In this position, it can be seen that the piston 14 has been moved a further distance axially forwardly from the disengaged position illustrated in FIG. 3. During normal operation of the clutch 100, the piston 14 reciprocates axially between the disengaged position illustrated in FIG. 3 and the engaged position illustrated in FIG. 4. The piston 14 is moved axially rearwardly to the disengaged position by the application of pressurized fluid within the chamber 48 and is moved axially forwardly to the disengaged position under the influence of the engagement springs 112 when the pressurized fluid within the chamber 48 is released.

Figure 5:
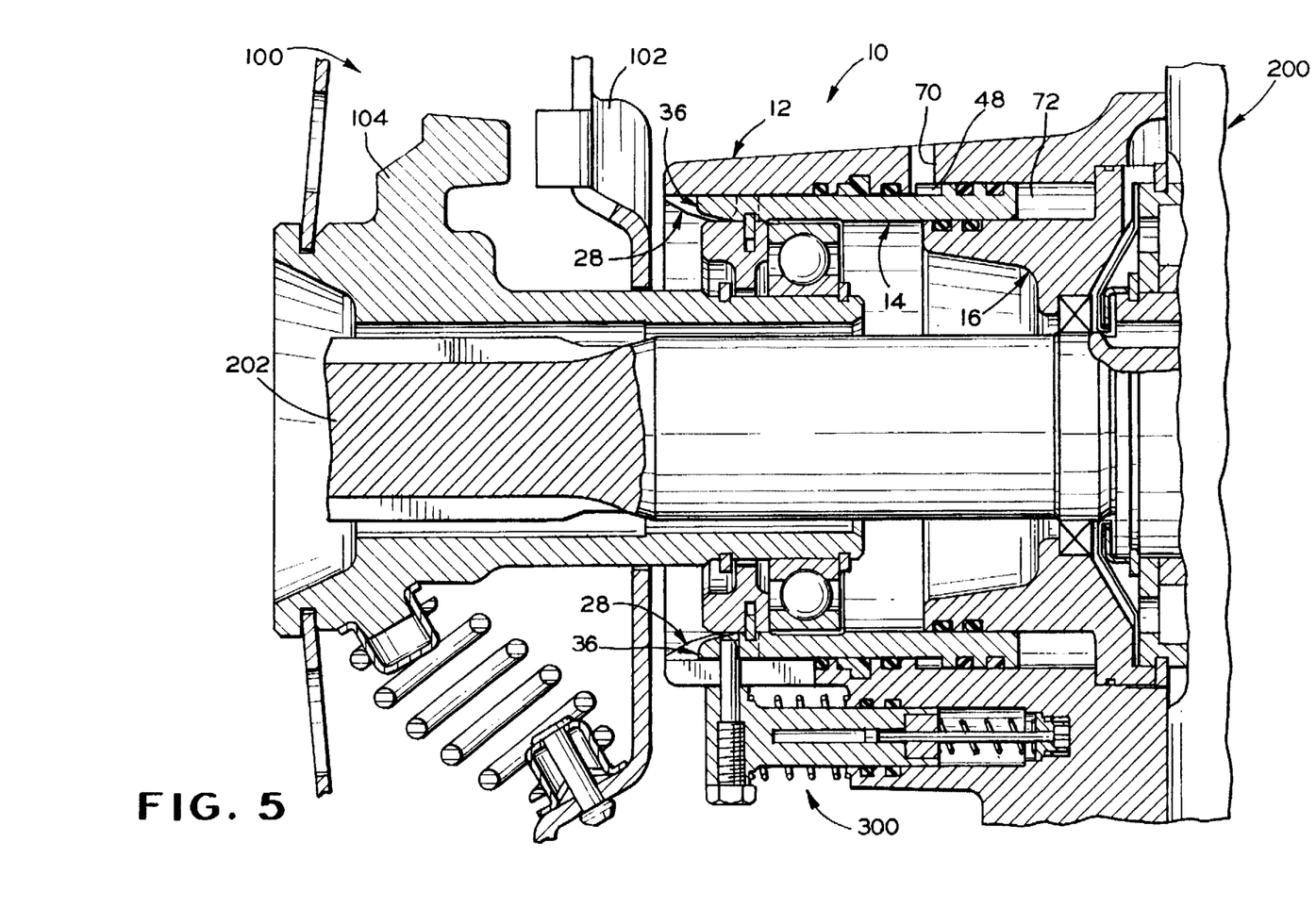
FIG. 5 is sectional elevational view similar to FIG. 4 wherein the clutch actuator is shown in a normally engaged position after the components of the clutch have become worn.

After a period of use, however, certain components within the clutch 100 (such as the friction facings provided on the driven disc assembly) will wear thinner. Also, it may be necessary to re-surface the flywheel of the clutch 100. In any event, such usage of the clutch 100 will result in a change in the engaged position for the components of the clutch 100 and, therefore, the components of the clutch actuator 10. FIG. 5 illustrates the normal engaged position of the piston 14 after such wear has occurred within the clutch 100. As shown therein, the release sleeve 104 is located somewhat axially further forwardly from the engaged position illustrated in FIG. 4. During normal operation of the clutch 100 after such wear has occurred, the piston 14 is moved axially between the disengaged position illustrated in FIG. 3 and the engaged position illustrated in FIG. 5. As discussed above, the protrusions 36 formed on the piston 14 are circumferentially interleaved with the ramps 28 formed on the outer cylinder housing 12. Thus, there is no physical contact between the protrusions 36 and the ramps 28 which would prevent free axial movement of the piston 14 relative to the outer cylindrical housing 12 between the disengaged position illustrated in FIG. 3 and the engaged position illustrated in FIG. 5.

In some instances, it may become desirable to disconnect the transmission 200 from the clutch 100. For example, such disconnection is necessary to perform service on either the transmission 200 or the clutch 100. As discussed above, however, the rearward end of the piston 14 is retained within the outer cylinder housing 14 secured to the forward end of the housing 201 of the transmission 200, while the forward end of the piston 14 is connected by means of the snap ring 132 to the release sleeve 104. This invention provides a simple mechanism for moving the snap ring 132 to a position where the piston 14 can be disconnected from the release sleeve 104, thereby allowing the transmission 200 and the clutch actuator 10 to be removed from the clutch 100.

Figure 6:
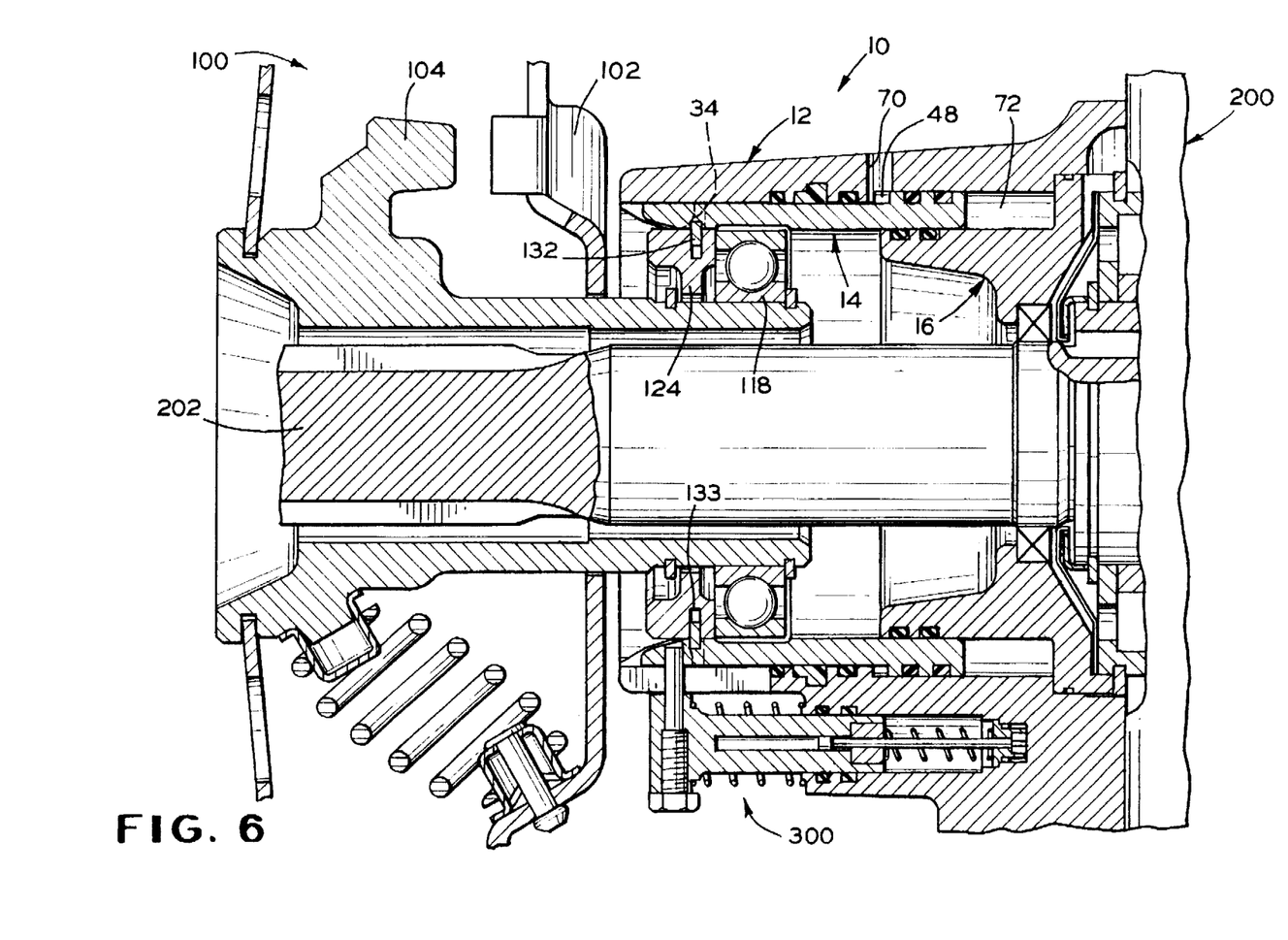
FIGS. 6 and 7 are sectional elevational views similar to FIG. 5 wherein the clutch actuator is sequentially moved beyond the normally engaged position to a fully extended position.
Figure 7:
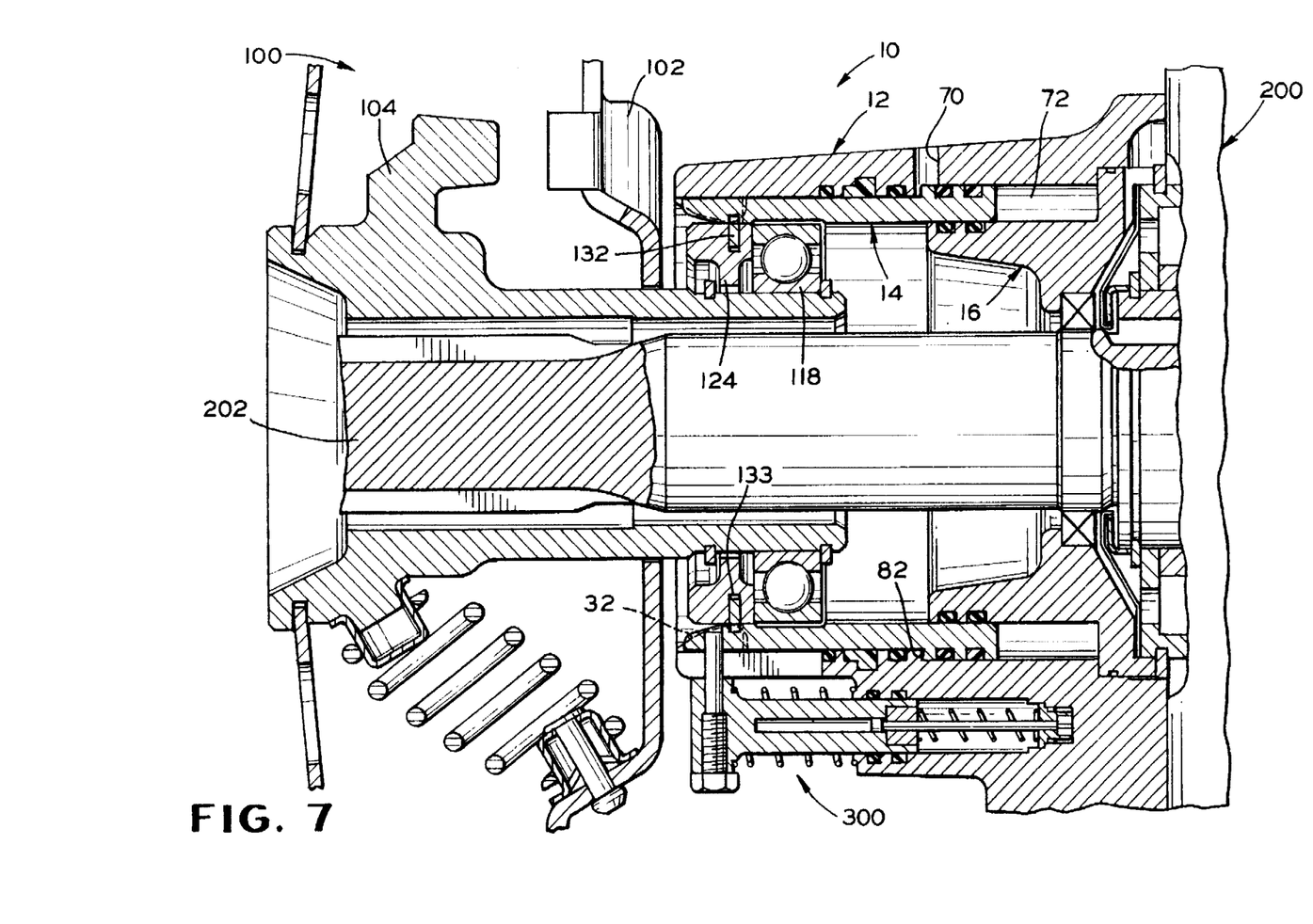

The disconnection of the piston 14 from the release sleeve 104 can be accomplished by moving the piston 14 axially forwardly further from the engaged position illustrated in FIG. 5, as illustrated sequentially in FIGS. 6 and 7. In FIG. 6, the piston 14 is shown as being moved forwardly to a point where a forwardly facing edge of the snap ring 132 engages the rearwardly facing tapered surfaces 34 of the ramps 28. Such engagement causes the snap ring 132 to be compressed radially inwardly within the groove 130 formed in the retaining ring 124, against the urging of the wave spring 133. Further forward axial movement of the piston 14, as shown in FIG. 7, causes the snap ring 132 to be fully compressed within the groove 130 and completely out of the grooves 40 formed in the protrusions 36, thereby freeing the piston 14 from movement therewith. At this point, the transmission 200 and the clutch actuator 10 can be moved axially rearwardly out of engagement with the release sleeve 104 and the other components of the clutch 100. As the piston 14 is moved rearwardly, the snap ring 132 again expands outwardly partially out of the groove 130 formed in the retaining ring 124.

When it is desired to re-connect the transmission 200 with the clutch 100, the transmission 200 is initially secured to the vehicle in the general position illustrated in FIGS. 2 through 7. The clutch actuator 10 is initially in the fully retracted position illustrated in FIG. 2 during such initial securement. Then, pressurized fluid can be introduced through a port (not shown) into an annular chamber 72 (see FIG. 3) defined between the rearward end of the rim 41 of the piston 14, the inner surface 47 of the outer cylinder housing 12, and the outer surface of the inner cylinder housing 16. O-rings 74 and 76 are provided in the annular grooves 42b formed in the outer surface of the inner cylinder housing 16 to provide a fluid-tight chamber 72. When pressurized fluid is introduced into the chamber 72, the piston 14 is moved axially forwardly toward the position illustrated in FIG. 7. As the piston 14 approaches the fully extended position illustrated in FIG. 7, the forwardly facing tapered surfaces 38 of the ramps 36 engage the snap ring 132, again compressing it radially inwardly within the groove 130 against the urging of the wave spring 133. When the piston 14 is in the fully extended position, the snap ring 132 is circumferentially aligned with the grooves 40 formed in the protrusions 36. Thus, the snap ring 132 expands outwardly into the grooves 40 formed on the piston 14. As a result, the piston 14 is re-connected to the release sleeve 104 for axial movement therewith.

In the illustrated embodiment, the snap ring 132 provides the operative connection between the piston 14 and the release sleeve 104 of the clutch 100. However, it will be appreciated that the snap ring 132 may be replaced by any other flexible, expandable, or contractible member which, upon engagement with the ramps 28, can be moved to a position wherein the connection between the piston 14 and the release sleeve 104 of the clutch 100 is broken.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A clutch actuator adapted to operate a clutch comprising:

an outer cylinder housing having at least one ramp formed thereon;

an inner cylinder housing disposed within said outer cylinder to define an annular chamber;

a piston disposed within said annular chamber for movement relative to said outer and inner cylinder housings; and a member mounted on said piston which is adapted to be connected to a portion of a clutch such that movement of said piston causes operation of the clutch, said member being engageable by said ramp formed on said outer cylinder housing when said piston is moved to a predetermined position so as to disconnect said member from said piston.

2. The clutch actuator defined in claim 1 wherein said ramp includes a tapered surface, said member being engageable by said tapered surface of said ramp when said piston is moved to said predetermined position so as to disconnect said member from said piston.

3. The clutch actuator defined in claim 1 wherein said ramp includes a forwardly facing tapered surface and a rearwardly facing tapered surface, said member being engageable by said rearwardly facing tapered surface of said ramp when said piston is moved forwardly to said predetermined position so as to disconnect said member from said piston.

4. The clutch actuator defined in claim 1 wherein said outer cylinder housing has a plurality of ramps formed thereon, said member being engageable by said ramps formed on said outer cylinder housing when said piston is moved to a predetermined position so as to disconnect said member from said piston.

5. The clutch actuator defined in claim 1 wherein said piston includes at least one projection formed thereon, said member being mounted on said projection of said piston.

6. The clutch actuator defined in claim 5 wherein said projection has a groove formed therein, said member being mounted in said groove formed in said projection of said piston.

7. The clutch actuator defined in claim 5 wherein said projection has a tapered surface and groove formed therein, said member being mounted in said groove formed in said projection of said piston.

8. The clutch actuator defined in claim 1 wherein said piston includes a plurality of projections formed thereon, said member being mounted on said projections of said piston.

9. The clutch actuator defined in claim 1 wherein said outer cylinder housing has a plurality of ramps formed thereon and said piston includes a plurality of projections formed thereon, said projections being circumferentially interleaved with said ramps.

10. The clutch actuator defined in claim 1 wherein said member is a snap ring.

11. A combined release sleeve and clutch actuator assembly adapted to operate a clutch comprising:

a release sleeve adapted to be connected to a portion of a clutch such that movement of said release sleeve causes operation of the clutch;

an outer cylinder housing having at least one ramp formed thereon;

an inner cylinder housing disposed within said outer cylinder to define an annular chamber;

a piston disposed within said annular chamber for movement relative to said outer and inner cylinder housings;

a member connecting said release sleeve with said piston such that movement of said piston causes corresponding movement of said release sleeve to operate the clutch, said member being engageable by said ramp formed on said outer cylinder housing when said piston is moved to a predetermined position so as to disconnect said member from said piston.

12. The clutch actuator defined in claim 11 wherein said ramp includes a tapered surface, said member being engageable by said tapered surface of said ramp when said piston is moved to said predetermined position so as to disconnect said member from said piston.

13. The clutch actuator defined in claim 11 wherein said ramp includes a forwardly facing tapered surface and a rearwardly facing tapered surface, said member being engageable by said rearwardly facing tapered surface of said ramp when said piston is moved forwardly to said predetermined position so as to disconnect said member from said piston.

14. The clutch actuator defined in claim 11 wherein said outer cylinder housing has a plurality of ramps formed thereon, said member being engageable by said ramps formed on said outer cylinder housing when said piston is moved to a predetermined position so as to disconnect said member from said piston.

15. The clutch actuator defined in claim 11 wherein said piston includes at least one projection formed thereon, said member being mounted on said projection of said piston.

16. The clutch actuator defined in claim 15 wherein said projection has a groove formed therein, said member being mounted in said groove formed in said projection of said piston.

17. The clutch actuator defined in claim 15 wherein said projection has a tapered surface and groove formed therein, said member being mounted in said groove formed in said projection of said piston.

18. The clutch actuator defined in claim 11 wherein said piston includes a plurality of projections formed thereon, said member being mounted on said projections of said piston.

19. The clutch actuator defined in claim 11 wherein said outer cylinder housing has a plurality of ramps formed thereon and said piston includes a plurality of projections formed thereon, said projections being circumferentially interleaved with said ramps.

20. The clutch actuator defined in claim 11 wherein said member is a snap ring.

* * * * *